US009175808B2

(12) United States Patent
Taskar et al.

(10) Patent No.: US 9,175,808 B2
(45) Date of Patent: Nov. 3, 2015

(54) SYSTEM AND METHOD FOR DECREASING SCRUBBER EXHAUST FROM GAS DELIVERY PANELS

(75) Inventors: Mark Taskar, San Mateo, CA (US); Iqbal Shareef, Fremont, CA (US)

(73) Assignee: Lam Research Corporation, Fremont, CA (US)

( * ) Notice: Subject to any disclaimer, the term of this patent is extended or adjusted under 35 U.S.C. 154(b) by 987 days.

(21) Appl. No.: 13/220,890

(22) Filed: Aug. 30, 2011

(65) Prior Publication Data

US 2012/0318362 A1    Dec. 20, 2012

Related U.S. Application Data

(60) Provisional application No. 61/498,210, filed on Jun. 17, 2011.

(51) Int. Cl.
*B60B 15/04* (2006.01)
*F17D 1/00* (2006.01)
*B08B 15/00* (2006.01)
*B08B 15/04* (2006.01)

(52) U.S. Cl.
CPC .............. *F17D 1/00* (2013.01); *B08B 15/002* (2013.01); *B08B 15/04* (2013.01); *Y10T 137/0318* (2015.04); *Y10T 137/6851* (2015.04); *Y10T 137/7736* (2015.04); *Y10T 137/7761* (2015.04); *Y10T 137/86107* (2015.04)

(58) Field of Classification Search
CPC .... B08B 15/002; B08B 15/005; B08B 15/04; C23C 16/4412; C23C 16/45561; Y10T 137/86107; Y10T 137/7736; Y10T 137/7761; F17D 1/00
USPC .................... 137/597, 467.5, 487.5
See application file for complete search history.

(56) References Cited

U.S. PATENT DOCUMENTS

| 5,913,721 | A | 6/1999 | Teng |
| 6,142,164 | A | 11/2000 | Wier et al. |
| 6,189,369 | B1 | 2/2001 | Yokogi |
| 6,302,139 | B1 * | 10/2001 | Dietz ............................ 137/240 |
| 6,799,603 | B1 * | 10/2004 | Moore .......................... 137/597 |
| 7,018,448 | B2 | 3/2006 | Wodjenski et al. |
| 7,537,018 | B1 * | 5/2009 | Curran et al. ..................... 137/3 |
| 7,846,497 | B2 * | 12/2010 | Gold et al. ................. 427/248.1 |
| 2007/0235085 | A1 * | 10/2007 | Nakashima et al. .......... 137/240 |
| 2008/0302434 | A1 * | 12/2008 | Taskar .......................... 137/884 |

OTHER PUBLICATIONS

PCT International Search Report and Written Opinion of the International Searching Authority (ISA) issued in International Application No. PCT/2012/042158, United States Patent and Trademark Office, Aug. 31, 2012.

* cited by examiner

*Primary Examiner* — William McCalister
(74) *Attorney, Agent, or Firm* — Martine Penilla Group, LLP

(57) ABSTRACT

A method and apparatus is provided for decreasing the scrubber exhaust from gas panels, lower the cost of operation, lower the facilitation cost and power consumption by increasing the air velocity in areas of high potential risk of ignition. The apparatus includes a supply of compressed dry air (CDA) through the tubing with individual dispersion nozzles. The CDA dispersion nozzles can be installed at various key locations in order to provide additional ventilation turbulence and reduce potential dead zones inside the gas panel. Aspects of the invention help to save the energy and protect the environment by reducing the power consumption. In addition human safety shall be improved by minimizing the potential risk of ignition.

11 Claims, 5 Drawing Sheets

SYSTEM AND METHOD FOR DECREASING SCRUBBER EXHAUST FROM GAS DELIVERY PANELS

The present application claims priority from U.S. Provisional Application No. 61/498,210 filed Jun. 17, 2011, the entire disclosure of which is incorporated herein by reference.

BACKGROUND

The present invention relates to the field of gas delivery systems, in particular, scrubbing of leaked process gas from gas panels.

A conventional processing system includes a processing chamber, sources of processing gases and a gas panel to control the flow of the processing gases from the sources to the processing chamber. One of the common uses of the gas panels is in the fabrication facilities. Gas panels are equipped with Mass flow controllers (MFC) and air operated valves and their arrangement is dependent on a particular application. An MFC is used to measure and control the flow of gases or fluids on the gas panels. This is further explained with the help of FIG. 1 for a conventional gas panel.

FIG. 1 illustrates an example arrangement for a conventional gas panel.

As illustrated in the figure, conventional gas panel 100 includes a plurality of MFC 102, a plurality of gas valves 104, and an exhaust system 106.

Each of MFC 102 receives a gas supply from a gas source via a respective gas supply line 108. A gas source may provide a gas or, more generally speaking, a fluid. Each gas supply line may carry a different respective gas or a fluid to a respective MFC 102. Each MFC 102 is designed and calibrated to control the flow of its received gas. In the example arrangement of FIG. 1, seventeen MFCs are arranged to receive seventeen different gas supplies from gas sources via inlet valves (not shown). Out of the different gases feeding in to gas panel 100, some may be process gases or compressed dry air (CDA) or inert gases as required by a particular application.

Each MFC 102, as shown by gas supply lines 110, feeds a respective gas valve. Each gas valve 104 can be an on/off valve or a controllable valve in order to control the flow of gas through it. Gas valve 104 further supplies gas to a process chamber (not shown) via supply lines 112.

Exhaust system 106 is used to extract any trapped gases within gas panel 100 via an outlet 114. Scrubber exhaust is an example, where unwanted gases are removed from the exhaust streams.

Some of the processing gases going in to MFC 102 via gas supply lines 108 are hazardous, e.g., flammable and/or poisonous. If any of the processing gases leak within gas panel 100, such as a result of a break in a processing gas line break, the leaked processing gas may pool within gas panel 100. The pooled processing gas creates a hazardous situation. This is further explained with the help of FIG. 2.

FIG. 2 illustrates a broken gas supply line between a MFC and a gas valve.

FIG. 2 illustrates a processing gas 206 being fed to a MFC 202. A gas supply line 208 between MFC 202 and a gas valve 204 is broken, resulting in a leaked gas 212. In one embodiment, MFC 202 and gas valve 204 are part of gas panel 100. In this example, leaked gas 212 gets pooled in gas panel 100, which must be removed. There may be dead space within gas panel 100, which may cause a hazardous situation. A dead space is a space within gas panel 100 in which there is little or no movement of the gas, e.g., no air current. Accordingly, leaked gas 212 may pool in such dead space.

Exhaust system 106 helps to extract gases from within gas panel 100 to address the leaked processing gases in gas panel 100. This is further explained with the help of FIG. 3.

FIG. 3 illustrates a conventional gas panel 300 with a broken processing gas line 208.

Conventional gas panel 300 includes all the components of conventional gas panel 100 except MFC 202 and gas valve 204. As illustrated in the figure, gas supply line 208 between MFC 202 and gas valve 204 is broken, resulting in leaked gas 212. Leaked gas 212 is trapped in dead zones within gas panel 300 as indicated by dotted lines. Gas panel 300 may include a mechanism to indicate the presence of unwanted gases inside gas panel 300. The amount of leaked gas 212 is concentrated in some pockets within gas panel 300, which may be more than the minimum allowable amount as per the safety requirements. Some of the processing gases are toxic and flammable; therefore, leaked gas 212 must be removed to avoid a hazardous situation.

Conventional gas panel 300 uses exhaust system 106 to extract gases from within gas panel 300. In many cases, exhaust system 106 may run continuously at its full capacity, and still be unable to remove the leaked gases pooled inside gas panel 300. In other words, in some instances exhaust system 106 does not work efficiently in performing its intended operation, whereas in other instances, exhaust system 106 does not perform its intended operation.

In case the amount of toxic gases within gas panel 300 is more than the minimum allowable amount, the conventional systems may increase the exhaust and scrubber to take care of the leaked gases. However, these conventional systems are not efficient at scrubbing leaked processing gas 212 from gas panel 300.

Additionally, scrubber exhaust from the gas panels adds to higher facilitation cost and power consumption. Most of the fabrication facilities, where the gas panels are used, are constantly requiring lowering the cost of operation, facilitation cost, power consumption, and building capital expenses. In addition, human safety shall be improved by minimizing the potential risk of ignition.

What is needed is an efficient system and method for scrubbing leaked processing gas from a gas panel.

BRIEF SUMMARY

The present invention provides an efficient system and method for scrubbing leaked processing gas from a gas panel.

An aspect of the present invention provides a gas panel for use with a gas source, a compressed air source and a chamber. The gas source can provide a flow of gas, whereas the compressed air source can provide a flow of compressed air. The gas panel includes a first gas supply line, a compressed air supply line, a mass flow controller, a valve an exhaust portion, a nozzle and a housing. The first gas supply line is arranged to receive gas from the gas source. The compressed air supply line is arranged to receive compressed air from the compressed air source. The mass flow controller can receive the gas via the first gas supply line and can provide a controllable output flow of the gas. The valve can be in a first state and a second state, can pass a first amount of the flow of the gas into the chamber when in the first state and can pass a second amount of the flow of the gas into the chamber when in the second state. The exhaust portion can remove a portion of the flow of the gas that is not passed into the chamber when the valve is in the first state. The nozzle can receive the compressed air via the compressed air supply line. The first gas supply line, the compressed air supply line, the mass flow controller, the valve and the nozzle are disposed within the housing. The nozzle can provide an output flow of the compressed air within the housing to provide a flow of the portion of the flow of the gas that is not passed into the chamber when the valve is in the first state.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Aspects of the invention provide a system and method to promote or create movement of the gas within the dead space, where the gases are trapped. In an example embodiment, a stream of compressed dry air (CDA) is supplied into the gas panel through a pneumatic harness with individual dispersion nozzles. The stream of compressed air creates movement of the gas within the dead space, which then assists in removal of the pooled processed gas. An exhaust system will therefore be able to work more efficiently as a result of the "push" provided by the compressed air nozzle. This is further explained with the help of FIG. 4.

Figure 1:
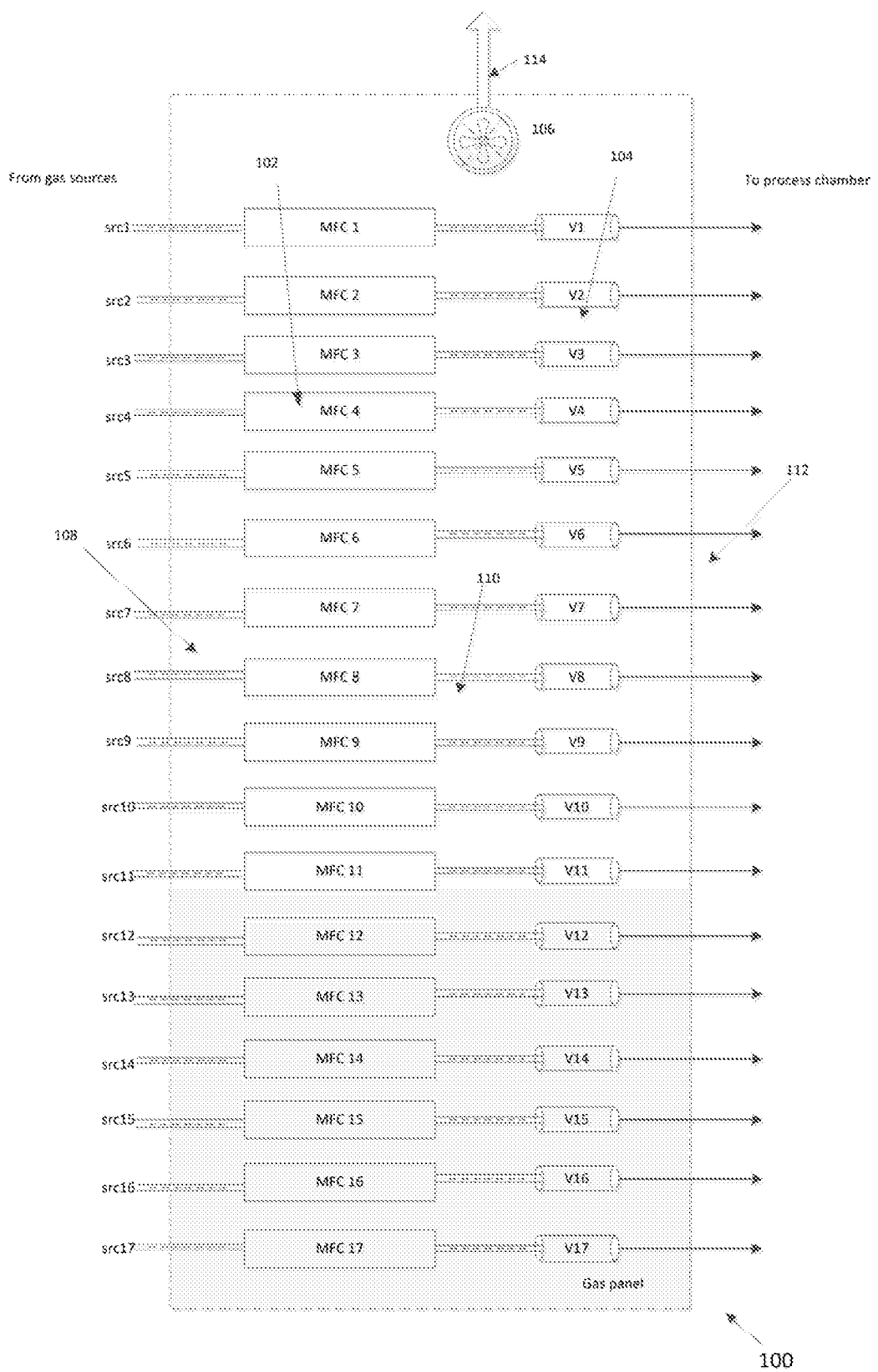
FIG. 1 illustrates an example arrangement for a conventional gas panel.
Figure 2:
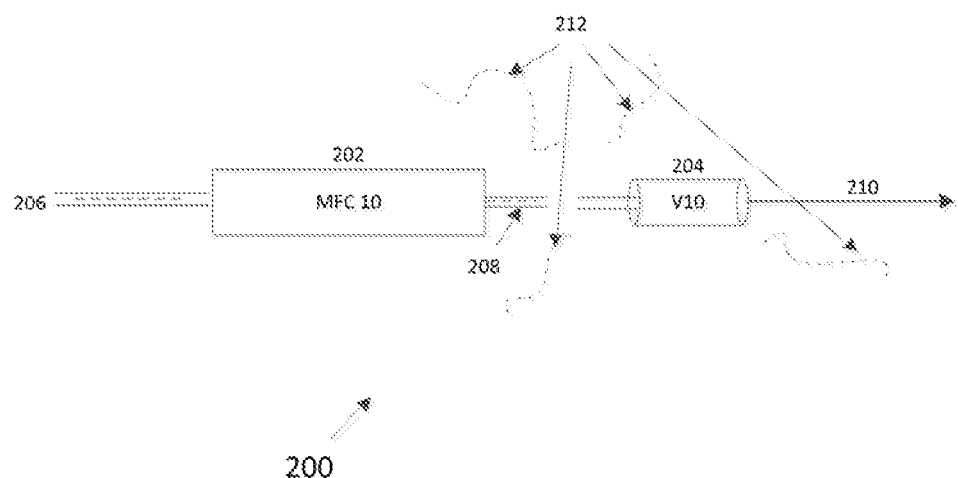
FIG. 2 illustrates a broken gas supply line between a MFC and a gas valve.
Figure 3:
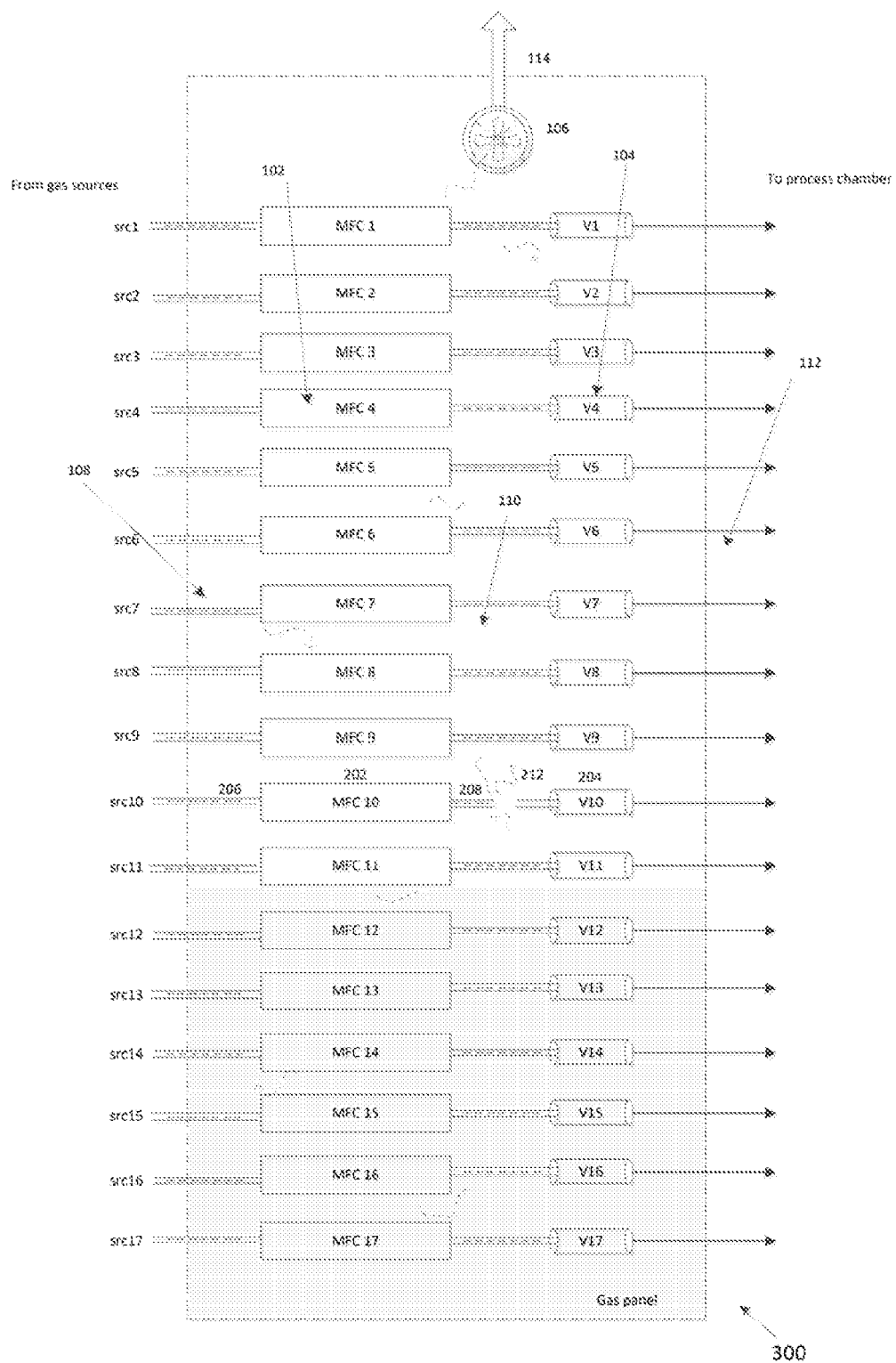
FIG. 3 illustrates a conventional gas panel with a broken processing gas line.
Figure 4:
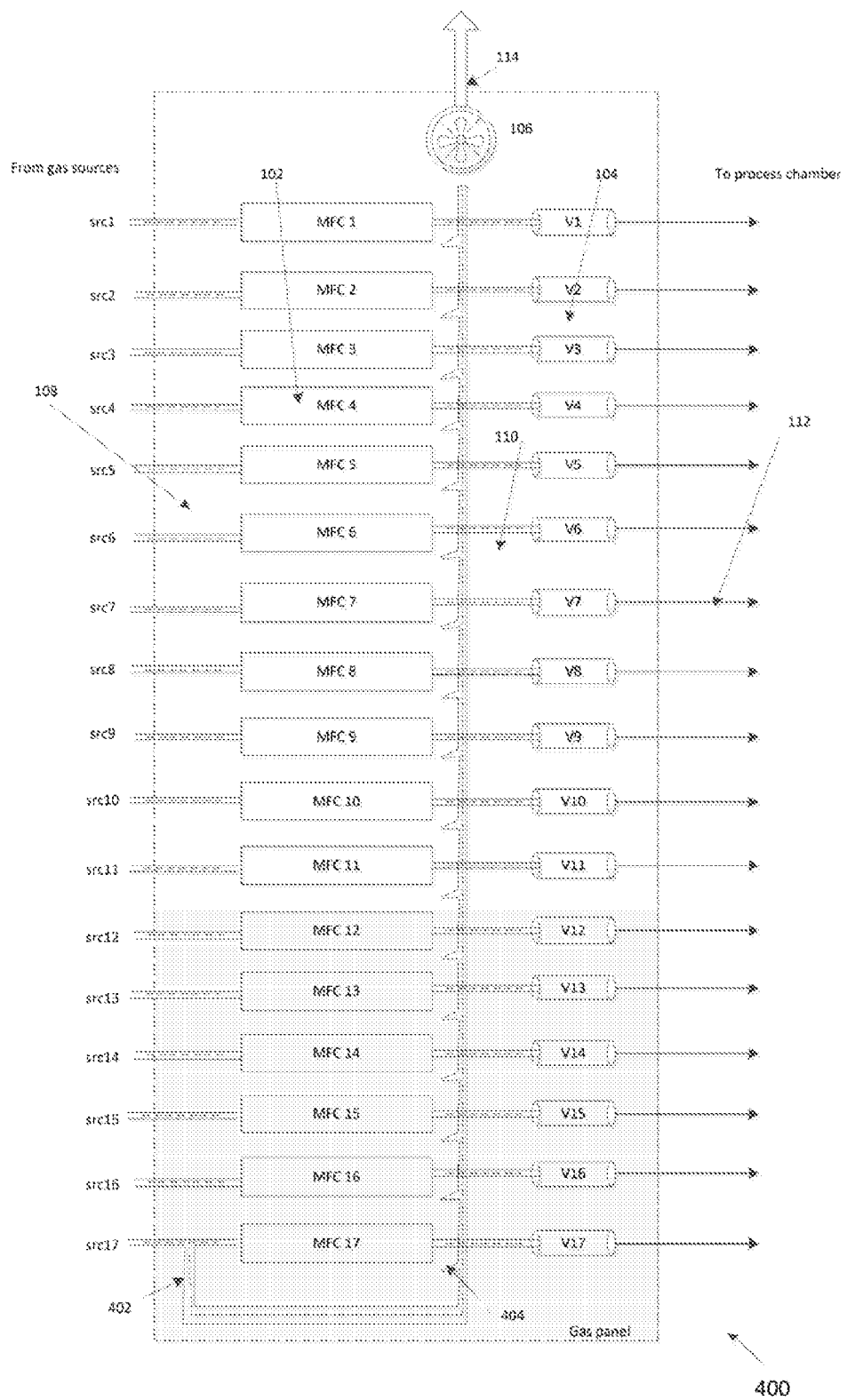
FIG. 4 illustrates an embodiment of a gas panel in accordance with an aspect of the invention.

FIG. 4 illustrates an embodiment of a gas panel in accordance with an aspect of the invention.

Gas panel 400 includes all the components of conventional gas panel 100 except compressed air 402 and dispersion nozzles 404. As illustrated in the figure, compressed air 402 is supplied through tubing to a plurality of dispersion nozzles 404. For the purposes of discussion, assume that compressed air 402 is available on one of the gas supply line 108. The multiple dispersion nozzles 404 installed at various key locations provide extra ventilation turbulence and reduce potential dead zones inside gas panel 400.

As illustrated in FIG. 4, dispersion nozzles 404 are placed between each MFC, however, this arrangement of dispersion nozzles 404 is for illustrative purposes only and is a non-limiting example. Dispersion nozzles 404 can be placed anywhere within gas panel 400 as long as they provide movement of leaked gases, which have pooled in the dead zones within gas panel 400. In one embodiment of the invention, dispersion nozzles are placed closer to the prospective dead zones in a gas panel.

In another embodiment of the invention, the amount of compressed air 402 dispersed through dispersion nozzles 404 can be controlled individually to provide different flow rates and pressure drops based on the amount of processing gases pooled inside gas panel 400. Dispersion nozzles 404 blow compressed air 402 supplied via one of the gas supply line 108 around the dead zones inside gas panel 400. With the help of dispersion nozzles 404, the gases pooled inside gas panel 400 can be moved out of those dead spaces, thereby, assisting exhaust system 106 to work more efficiently in removing those pooled gases.

In another embodiment of the invention, gas panel 400 may have a detector to detect the presence of gases, which may have leaked inside gas panel 400. Gas panel 400 may also include a controller to control the supply of compressed air once the leaked gas is detected by the detector inside gas panel 400. This is further explained with the help of FIG. 5.

Figure 5:
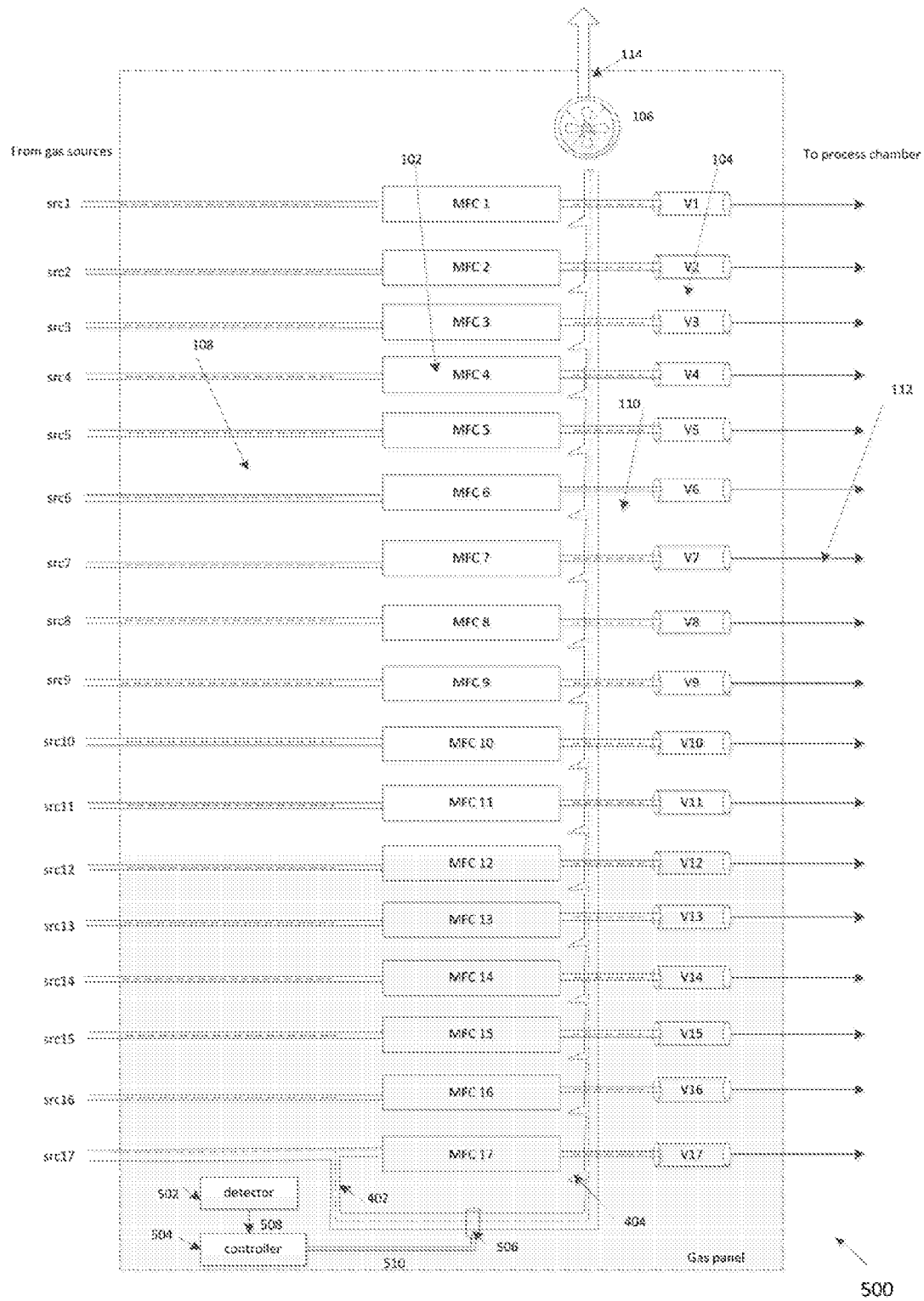
FIG. 5 illustrates another embodiment of a gas panel in accordance with an aspect of the invention.

FIG. 5 illustrates another embodiment of a gas panel in accordance with an aspect of the invention.

Gas panel 500 includes all the components of gas panel 400 except a detector 502, a controller 504 and a valve 506.

Detector 502 is operable to detect presence of gases within gas panel 500, when there is leaked gas pooled inside gas panel 500. Detector 502 communicates to controller 504 via a control signal 508 the amount of gas detected within gas panel 500.

Controller 504 is operable to control the amount of compressed air 402 provided by dispersion nozzles 404 based on an amount of gas detected by detector 502. In the event, when no gas is detected by detector 502, controller 504 can disable dispersion nozzles 404 with the help of control valve 506 via a control signal 510. Alternatively, when detector 502 detects the presence of gas inside gas panel 500, it indicates controller 504 to enable dispersion nozzles 404 such that the amount of compressed air 402 provided by dispersion nozzles 404 is based on the amount of gas detected by detector 502.

As discussed with reference to FIGS. 4-5, when the processing gas is pooled inside a gas panel due to a broken gas supply line, presence of gas is detected inside the gas panel by a gas detector. In this case, the gas detector instructs a CDA controller to enable the dispersion nozzles in order to provide movement of the pooled gas at various locations, where there is higher concentration of the leaked gas.

In accordance with aspects of the invention, dispersion nozzles 404 assist exhaust system 106 by increasing the air velocity within gas panel 500 in areas of high potential risk of ignition. Hence, the power consumption by exhaust system 106 is reduced because exhaust system 106 does not need to be run at its full capacity. Therefore, aspects of the invention help to save the energy and protect the environment. In addition human safety shall be improved by minimizing the potential risk of ignition.

Sampling locations for air pattern test are usually chosen in areas where lower air velocity is expected and in areas of high potential risk of ignition. For an arrangement of dispersion nozzles in a gas panel, in accordance with aspects of the invention, in a test with 10 slm (standard liters per minute) of CDA releasing rate and the flammable process gases within no more than 2.0 slm, the exhaust rate decreased by 25%.

The present invention discusses the use of CDA to create movement of the pooled gases within a gas panel, however, it is not limited to only compressed air and any substance or liquid suitable for increasing the air velocity in the dead zones, where the gases are trapped, can be used.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A gas panel for use with a gas source, a compressed air source and a chamber, the gas source being operable to provide a flow of gas, the compressed air source being operable to provide a flow of compressed air, said gas panel comprising:
   a first gas supply line arranged to receive gas from the gas source;
   a compressed air supply line arranged to receive compressed air from the compressed air source;
   a mass flow controller operable to receive the gas via said first gas supply line and to provide a controllable output flow of the gas;
   a valve operable to be in a first state and a second state, to pass a first amount of the flow of the gas into the chamber when in the first state and to pass a second amount of the flow of the gas into the chamber when in the second state;
   an exhaust portion operable to remove a portion of the flow of the gas when not passed into the chamber when said valve is in the first state, wherein the portion of the flow of gas is not passed into the chamber when a broken line is present between the mass flow controller and the valve;
   a nozzle positioned between the mass flow controller and the valve and operable to receive the compressed air via said compressed air supply line;
   a housing;
   a gas detector operable to detect a presence of the gas within said housing when the gas is present in said housing; and
   a compressed air controller operable to control an amount of compressed air provided by said nozzle based on an amount of gas detected by said gas detector;
   wherein said first gas supply line, said compressed air supply line, said mass flow controller, said valve and said nozzle are disposed within said housing, and
   wherein said nozzle is operable to provide an output flow of the compressed air within said housing to provide a flow of the portion of the flow of the gas that is not passed into the chamber when said valve is in the first state.

2. The gas panel of claim 1, wherein said compressed air controller operable to disable said nozzle from providing compressed air when said gas detector detects no presence of the gas in said housing.

3. The gas panel of claim 2, wherein said compressed air controller is operable to enable said nozzle to provide compressed air when said gas detector detects a presence of the gas in said housing.

4. The gas panel of claim 1, wherein said compressed air controller is operable to enable said nozzle to provide compressed air when said gas detector detects a presence of the gas in said housing.

5. A gas panel for use with a first gas source, a second gas source, a compressed air source and a chamber, the first gas source being operable to provide a first flow of a first gas, the second gas source being operable to provide a second flow of a second gas, the compressed air source being operable to provide a flow of compressed air, said gas panel comprising:
   a first gas supply line arranged to receive first gas from the first gas source;
   a second gas supply line arranged to receive second gas from the second gas source;
   a compressed air supply line arranged to receive compressed air from the compressed air source;
   a first mass flow controller operable to receive the first gas via said first gas supply line and to provide a controllable output flow of the first gas;
   a second mass flow controller disposed so as to have a space between said second mass flow controller and said first mass flow controller, said second mass flow controller being operable to receive the second gas via said second gas supply line and to provide a controllable output flow of the second gas;
   a first valve operable to be in a first state and a second state, to pass a first amount of the flow of the first gas into the chamber when in the first state and to pass a second amount of the flow of the first gas into the chamber when in the second state;
   a second valve operable to be in a third state and a fourth state, to pass a third amount of the flow of the second gas into the chamber when in the third state and to pass a fourth amount of the flow of the second gas into the chamber when in the fourth state;
   an exhaust portion operable to remove a portion of the flow of the first gas when not passed into the chamber when said first valve is in the first state and to remove a portion of the flow of the second gas when not passed into the chamber when said second valve is in the third state, wherein the portion of the flow of the first or second gas is not passed into the chamber when a broken line is present between respective ones of the first or second mass flow controllers and the first or second valves;
   a nozzle operable to receive the compressed air via said compressed air supply line;
   a housing;
   a gas detector operable to detect a presence of either the first or second gas within said housing when present in said housing; and
   a compressed air controller operable to control an amount of compressed air provided by said nozzle based on an amount of gas detected by said gas detector;
   wherein said first gas supply line, said second gas supply line, said compressed air supply line, said first mass flow controller, said second mass flow controller, said first valve, said second valve and said nozzle are disposed within said housing, and
   wherein said nozzle is disposed a space between said second mass flow controller and said first mass flow controller and further between the first mass flow controller and the first valve and the second mass flow controller and the second valve and operable to provide an output flow of the compressed air within said housing to provide a flow of the portion of the flow of the first or second gas when not passed into the chamber.

6. The gas panel of claim 5, wherein said compressed air controller is operable to disable said nozzle from providing compressed air when said gas detector detects no presence of the gas in said housing.

7. The gas panel of claim 5, wherein said compressed air controller is operable to enable said nozzle to provide compressed air when said gas detector detects a presence of the gas in said housing.

8. The gas panel of claim 5, wherein the nozzle is one of a plurality of nozzles extending along a pneumatic harness of individual dispersion nozzles.

9. The gas panel of claim 8, wherein each of the individual dispersion nozzles extends linearly between a plurality of mass flow controllers, where the plurality of mass flow controllers includes the first and second mass flow controllers.

10. The gas panel of claim 1, wherein the nozzle is one of a plurality of nozzles extending along a pneumatic harness of individual dispersion nozzles.

11. The gas panel of claim 10, wherein each of the individual dispersion nozzles extends linearly between a plurality of mass flow controllers, where the mass flow controller is one of the plurality of mass flow controllers in the housing.

\* \* \* \* \*